US011252871B2

United States Patent
Basso et al.

(10) Patent No.: US 11,252,871 B2
(45) Date of Patent: Feb. 22, 2022

(54) ROTARY CLEANING SHOE (71) Applicant: AGCO International GmbH, Neuhausen (CH)

(72) Inventors: Paolo Basso, Breganze (IT); Fabio Racchella, Breganze (IT)

(73) Assignee: AGCO International GmbH, Neuhausen (CH)

(*) Notice: Subject to any disclaimer, the term of this patent is extended or adjusted under 35 U.S.C. 154(b) by 0 days.

(21) Appl. No.: 16/575,239

(22) Filed: Sep. 18, 2019

(65) Prior Publication Data

US 2020/0093066 A1  Mar. 26, 2020

(30) Foreign Application Priority Data

Sep. 20, 2018  (GB) .................................. 1815328

(51) Int. Cl.
*A01F 12/44* (2006.01)
*A01F 7/06* (2006.01)

(52) U.S. Cl.
CPC ............ *A01F 12/442* (2013.01); *A01F 7/062* (2013.01)

(58) Field of Classification Search
CPC ........ A10F 7/062; A10F 12/442; A10F 12/20; A10F 12/22; B07B 1/22; B07B 1/24; B07B 1/26; A01F 7/062; A01F 12/442; A01F 12/20; A01F 12/22; A01F 7/06; A01F 7/065; A01F 7/067; A01F 12/182
See application file for complete search history.

(56) References Cited

U.S. PATENT DOCUMENTS

| 272,278 A | * | 2/1883 | Lipps | B07B 1/4636 |
| | | | | 209/398 |
| 560,586 A | * | 5/1896 | Koch | B07B 1/4636 |
| | | | | 209/398 |
| 1,133,421 A | * | 3/1915 | Aspinwall et al. ... | B07B 1/4636 |
| | | | | 209/398 |
| 1,564,585 A | * | 12/1925 | Krause | A01F 7/06 |
| | | | | 209/284 |
| 1,668,629 A | * | 5/1928 | Church | B07B 1/24 |
| | | | | 209/297 |
| 2,129,452 A | * | 9/1938 | Van Sickle | A01F 12/442 |
| | | | | 209/297 |
| 2,315,651 A | * | 4/1943 | Peterson | B07B 1/469 |
| | | | | 209/398 |
| 2,520,718 A | * | 8/1950 | Hanson | B07B 1/4636 |
| | | | | 222/171 |

(Continued)

FOREIGN PATENT DOCUMENTS

| GB | 198828 A | * | 6/1923 | ............... B07B 1/24 |
| GB | 615967 A | * | 1/1949 | ............... B07B 1/24 |

(Continued)

OTHER PUBLICATIONS

UK Intellectual Property Office, Search Report for Priority Application No. GB1815328.8, dated Mar. 20, 2019.

*Primary Examiner* — Thomas B Will
*Assistant Examiner* — Joan D Misa (57) ABSTRACT

A rotary sieve cleaning shoe for cleaning grain, having at least one rotary sieve with a generally cylindrical volume arranged to rotate around a longitudinal axis and having at least one beater bar within the cylinder which remains stationary when the rotary sieve rotates.

8 Claims, 8 Drawing Sheets

(56) References Cited

U.S. PATENT DOCUMENTS

| | | | | |
|---|---|---|---|---|
| 2,811,158 | A | * | 10/1957 | Rietmann ............. A01F 12/442 460/80 |
| 3,007,576 | A | * | 11/1961 | Hannaford ................ B07B 1/24 209/296 |
| 3,348,676 | A | * | 10/1967 | Karlsson ............... A01F 12/442 209/22 |
| 3,373,871 | A | | 3/1968 | Huether |
| 3,397,778 | A | * | 8/1968 | Karlsson ............... A01F 12/442 209/23 |
| 3,982,548 | A | * | 9/1976 | Stamp ...................... A01F 7/06 460/68 |
| 4,178,942 | A | | 12/1979 | Nusser |
| 4,274,426 | A | * | 6/1981 | Williams ................ A01F 7/062 460/67 |
| 4,284,086 | A | * | 8/1981 | Williams ................ A01F 12/18 460/150 |
| 4,422,462 | A | * | 12/1983 | Decoene ............. A01F 12/442 460/100 |
| 4,464,887 | A | * | 8/1984 | Decoene .................. B07B 9/00 209/287 |
| 4,475,561 | A | * | 10/1984 | Decoene .................. B07B 9/00 460/100 |
| 4,510,946 | A | | 4/1985 | Decoene et al. |
| 4,535,787 | A | * | 8/1985 | Underwood ............. A01F 7/06 460/101 |
| 4,541,441 | A | * | 9/1985 | Ichikawa ............. A01F 12/442 460/66 |
| 4,700,718 | A | * | 10/1987 | Rissanen ................ A01F 7/062 460/61 |
| 4,919,642 | A | * | 4/1990 | Sukup ...................... B02B 1/02 460/80 |
| 5,045,025 | A | * | 9/1991 | Underwood ............. A01F 7/06 460/66 |
| 5,803,807 | A | * | 9/1998 | Satzler ................... A01F 7/062 460/119 |
| 5,885,155 | A | * | 3/1999 | Dwyer .................... A01F 12/18 460/109 |
| 5,950,940 | A | * | 9/1999 | Hoof ..................... B02C 13/284 241/73 |
| 6,213,870 | B1 | * | 4/2001 | Satzler ................... A01F 7/062 460/116 |
| 6,468,152 | B2 | * | 10/2002 | Moriarty .................. A01F 7/06 460/67 |
| 7,942,353 | B2 | * | 5/2011 | Cerra ....................... B07B 1/18 241/73 |
| 2014/0179382 | A1 | | 6/2014 | Regier |
| 2015/0065212 | A1 | * | 3/2015 | Kvist ....................... A01F 7/70 460/61 |

FOREIGN PATENT DOCUMENTS

| | | | | |
|---|---|---|---|---|
| GB | 1181282 | A | * | 2/1970 ........... A01F 12/442 |
| GB | 1181282 | A | | 2/1970 |
| GB | 1526740 | A | | 9/1978 |
| GB | 2354690 | A | | 4/2001 |

\* cited by examiner

ROTARY CLEANING SHOE

FIELD OF INVENTION

The present invention relates to a rotary cleaning shoe. In particular, the invention relates to a rotary cleaning shoe comprising rotary sieves for use in cleaning threshed crop material. Such a rotary cleaning show may typically be found in agricultural machines or vehicles, such as a combine harvester.

BACKGROUND OF INVENTION

Combine harvesters typically comprise a header for cutting standing crop and conveying it to a feeder house, the feeder house then drawing the cut crop into the machine and feeding it to a threshing device or 'processor'. The threshing device may be a so-called 'straw walker' thresher, which is generally planar, or more and more commonly may be a rotary thresher. The thresher generally separates the majority of the grains from straw and other MOG. Beneath the thresher is generally a cleaning shoe which takes the initially separated grain and cleans it by removing the remainder of the MOG from the grain which has fallen from the thresher. To date, most cleaning shoes comprise a set of planar sieves which reciprocate to allow (generally relatively heavy) grain to fall through holes of a particular (and often adjustable) size, whilst (generally relatively light) MOG is carried along the sieves towards a discharge outlet. A fan is also commonly used to blow air up and through the sieves to encourage the generally lighter MOG towards the discharge outlet.

It is commonly recognised that there are limitations to the reciprocating planar sieve model, including the fact that it relies on gravity (to pull the grains down through the holes) and the fact that the sieving area, being planar, is naturally limited by the footprint of the combine in which it is contained.

Rotary cleaning shoes have been revealed previously, such as in GB1181282 and U.S. Pat. No. 3,373,871. The advantage of these is that the rotary action of the sieve and the resultant apparent 'centrifugal force' allows for a separating action on the grains which may exceed that of mere gravity, and also that the available area of sieve may be readily made to be greater than the footprint of the combine in which it is contained. Accordingly there is greater sieving potential to a rotary cleaning shoe. However, widespread adoption of this model has yet to occur.

Currently however the efficiency of other parts of combine harvesters has now reached a point where the sheer amount of crop material entering the machine is such that traditional planar sieve cleaning shoes are reaching the limits of their ability to cope with the amount of grain/MOG which they are required to clean; the rotary cleaning shoe, with its known advantages, is now a consideration for inclusion in new combine harvester platforms. Further improvements to the rotary cleaning shoe would thus be desirable.

BRIEF DESCRIPTION OF THE DRAWINGS

The invention will now be described by reference to the attached Figures.

FIGS. 6A-1 and 6A-2 show a schematic partial view of a rotary sieve 10a indicating how inner sieve element 11a may be moved longitudinally relative to outer sieve element 12a, to change the hole size of the sieve 10a as required for different crops and crop conditions.

DETAILED DESCRIPTION

The Figures show a rotary cleaning shoe 1 comprising a housing 3 containing a pair of rotary sieves 10a and 10b, inside are beaters 14a, 14b. The sieves 10a, 10b are generally cylindrical and have longitudinal axes Xa and Xb.

The housing is shaped to accommodate a pair of cylindrical sieves 10a, 10b in close side-by-side alignment and generally provides a surround to the upper and outside surfaces of both sieves, whereas the lower surface of the housing is essentially open to allow clean grain to fall from the housing to a collection point beneath the rotary cleaning shoe. The housing has a main section 3m and a rear panel 3p. The sieves 10a, 10b can be inserted into the main housing section 3m via the open underside of housing 3. The beaters 14a, 14b can then be inserted into the sieves 10a, 10b via the holes 3h at the rear end 3b of the main section 3m, through the sieves and attached at the front end to receiving element 14rc—the holes 3h are then partly closed off by the attachment of panel 3p which also provides a rear receiving element 14rc for the rear ends of the beaters 14a, 14b to be engaged with.

Figure 1:
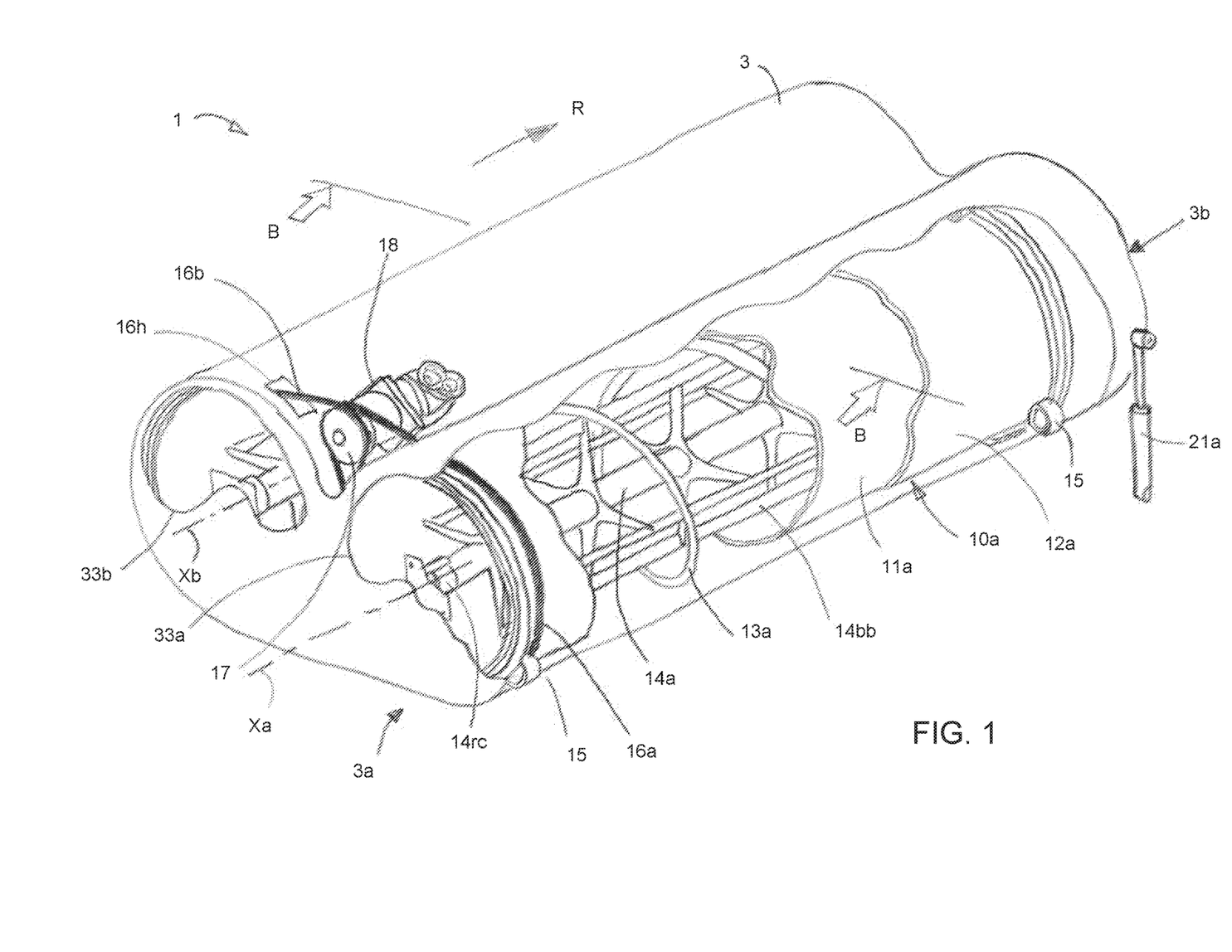
FIG. 1 shows a 'cutaway' view of a rotary cleaning shoe in accordance with embodiments of the invention, having two rotating sieves contained within a housing.
Figure 2:
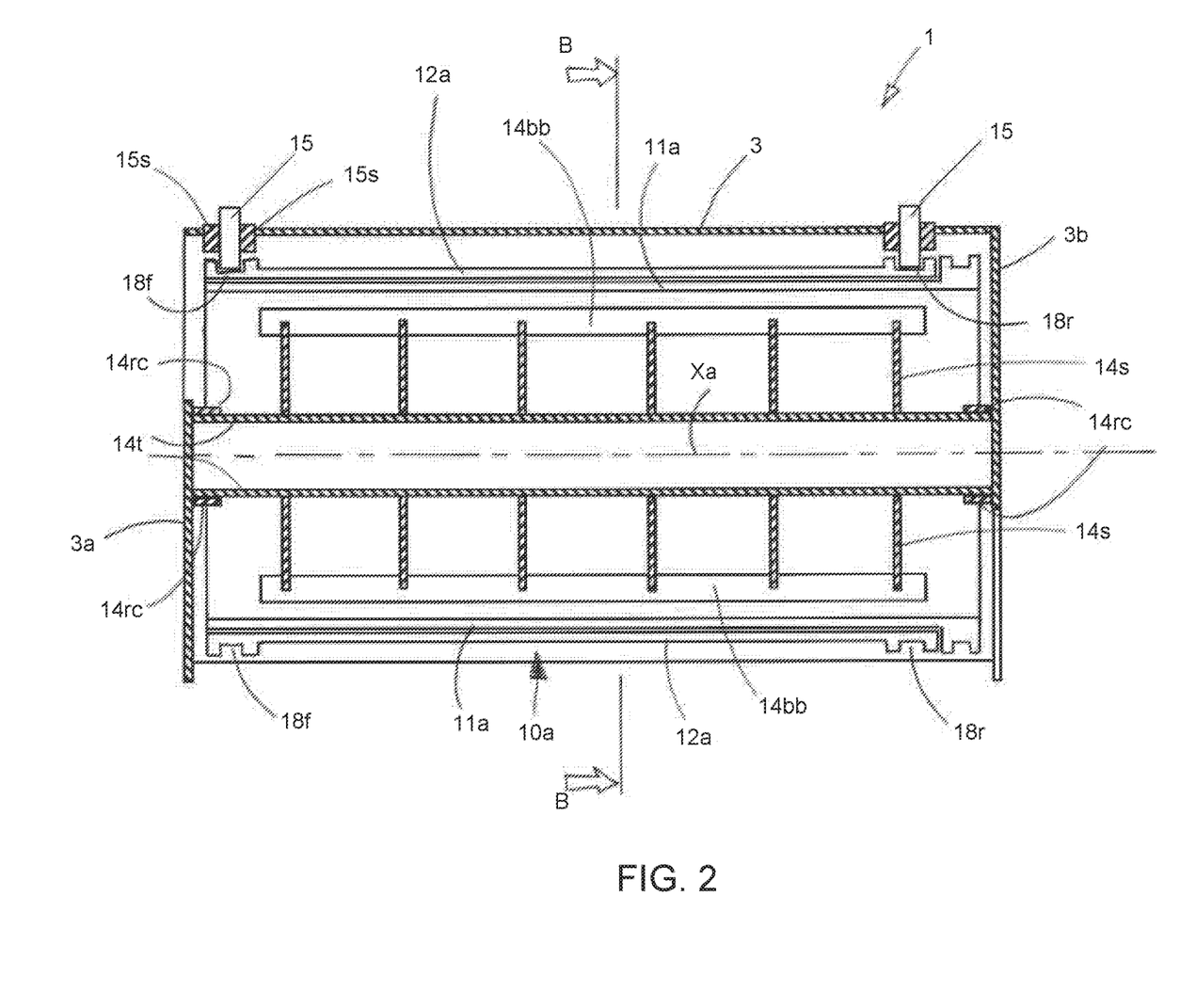
FIG. 2 shows a cross-sectional view, in schematic form, of the rotary cleaning shoe of FIG. 1, in the direction of the arrows A seen in FIG. 3.
Figure 3:
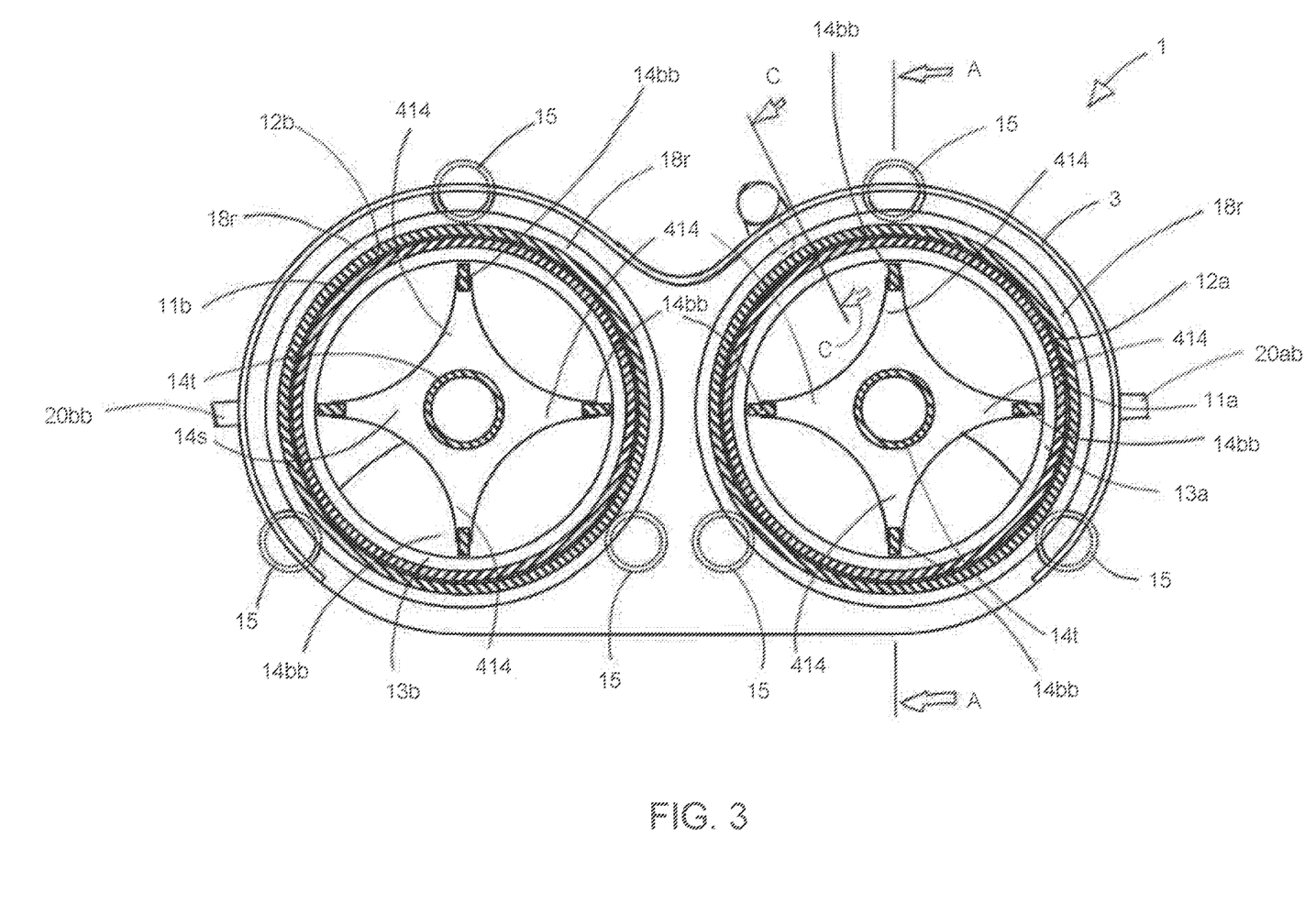
FIG. 3 shows a schematic cross-sectional view of the rotary cleaning shoe of FIG. 1, in the direction of arrows B seen in FIGS. 1 and 2.
Figure 4:
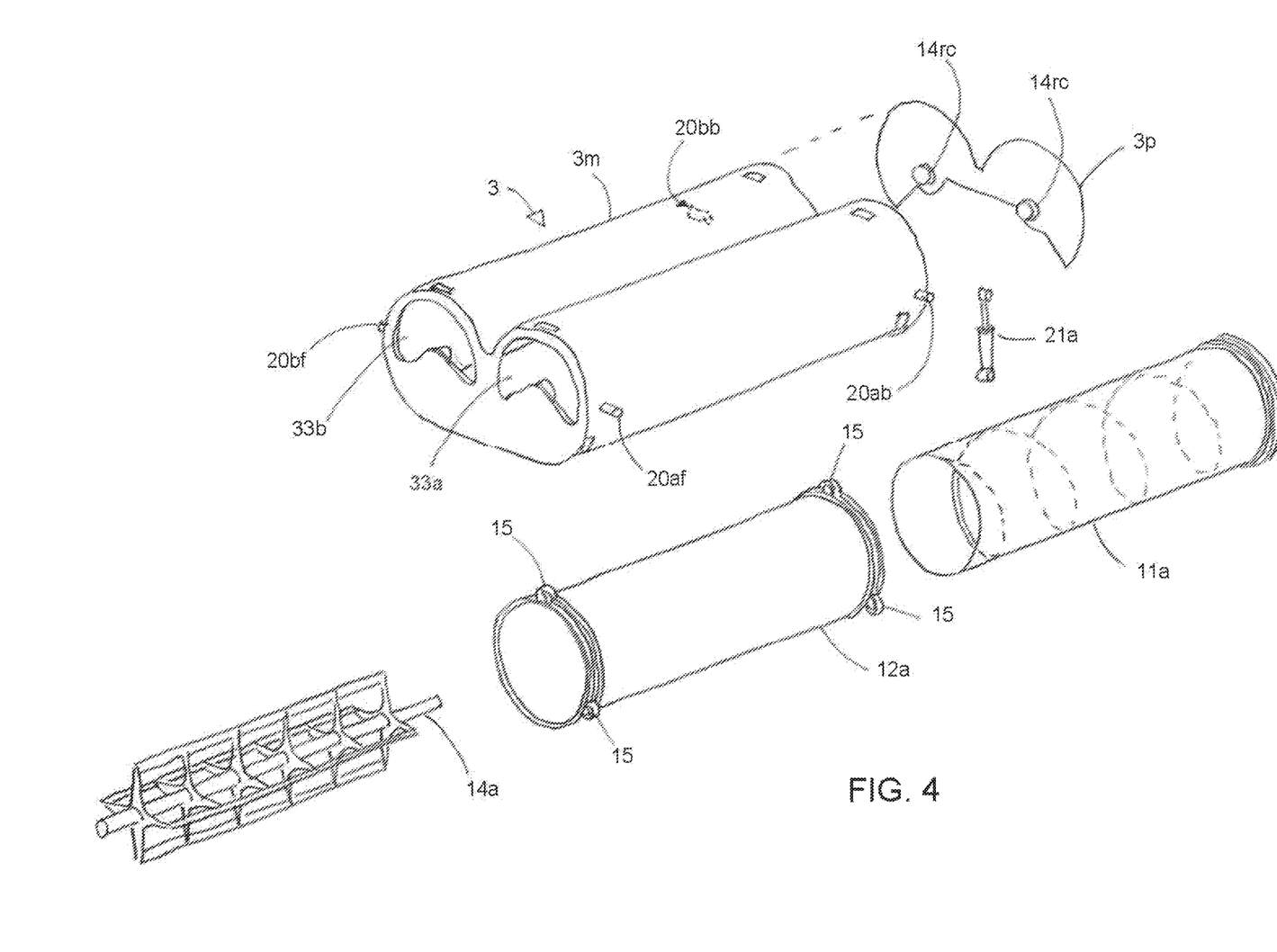
FIG. 4 shows an exploded view of various components of the rotary cleaning shoe seen in FIGS. 1 to 3.
Figure 5:
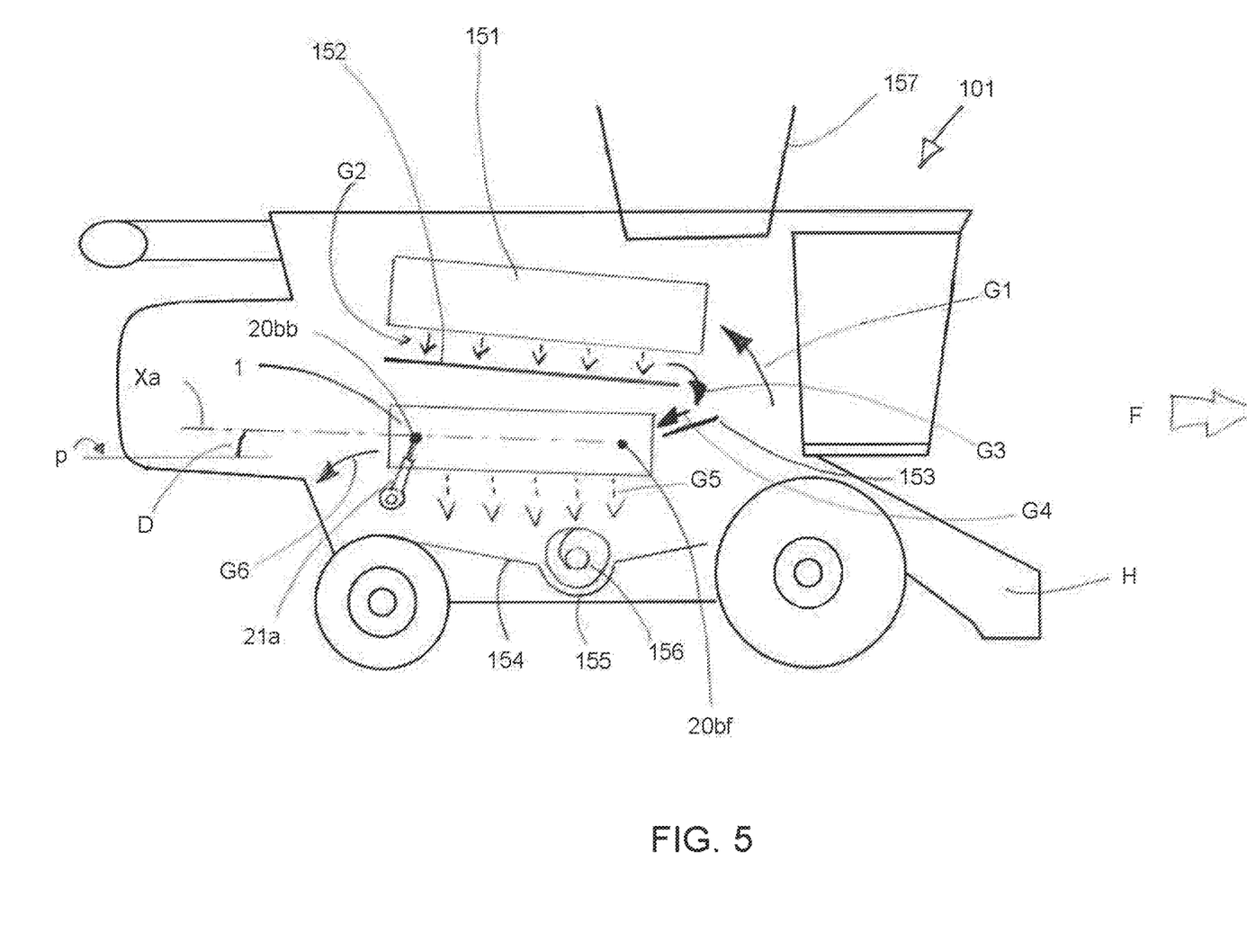
FIG. 5 shows a schematic view of a rotary cleaning shoe in accordance with the present invention, in a combine harvester 101.

The parts of holes 3h which are not close off allow for MOG to exit the back end of the cleaning shoe 1. Housing 3 also has apertures 33a, 33b in front face 3a of housing 3 to allow for pre-cleaned grain and MOG to be fed into the cleaning shoe 1. Each rotary sieve 10a and 10b comprises inner and outer sieve elements 11a, 12a and 11 b, 12b respectively. The inner surface of each of the inner sieve elements 11a, 11 b is provided with a spiral guide vane 13a, 13b respectively, which acts to drive material in the sieve in the direction of arrow R. Arrow R is nominally rearwards in relation to the normal forward direction of travel F of a combine harvester 101 in which the rotary cleaning shoe may be installed as depicted in FIG. 5.

Further situated within the envelope of each rotary sieve 10a, 10b is a beater 14a, 14b, each of which is connected at either end to the housing 3 at engagement points 14rc and is static. Each beater comprises a tubular core section 14t to which are attached a plurality of support arm plates 14s, each support arm plate 14s having four arms 414, and the end of each arm 414 supporting a beater bar 14bb. The beaters are slotted in to the receiving cylinders 14rc which are welded to the inner surfaces of the ends 3a and 3b of the housing 3. The inner surface of end 3b of the housing 3 will constitute the inner surface of the panel 3p in this case.

The rotary sieves 10a, 10b are each supported within the housing 3 on the outer faces 15f of ballrace bearings 15, the inner ring 15i of each ballrace being mounted on the housing 3 via supports 15s. There are three ballraces provided at either end of each rotary sieve, mounted equilaterally around the sieves. Each outer sieve element 12a, 12b is provided with an external channel near either end of the sieve element —18f at the front ends, 18r at the rear ends—in which the outer surface of the ballrace runs; the engagement of each of the ballraces within this channel also provides a means of maintaining the longitudinal position of each of the sieves 10a, 10b.

Each rotary sieve 10a, 10b is provided with a belt 16a, 16b which is driven by a pulley wheel 17. Pulley wheel 17 is driven in turn by hydraulic motor 18 which is situated on the outside of housing 3. Access holes 16h are provided so that the belts 16a, 16b can run from the pulley 17 to the sieves 10a, 10b respectively.

The housing 3 is further provided with pivot mounting spindles 20af, 20ab, 20bf and 20bb, located respectively at the front sides (20af, 20bf) and the rear sides (20ab, 20bb), of the housing. The front spindles 20af, 20bf are for location in suitable stationary mounting points (not shown) of the body, chassis or main frame of a combine harvester. The rear spindles 20ab, 20bb are for engaging at the top ends 21at, 21bt of hydraulic actuators 21a, 21b, the bottom ends 21ab, 21bb of which are also mounted to the body, chassis or main frame of the same combine harvester.

Extension or retraction of the actuators 21a, 21b has the effect of raising or lowering the back end 3b of the housing 3 relative to the front end 3a, and thus changing the angle D of the housing (and thus the sieves) relative to the longitudinal of the body/chassis/main frame of the combine harvester. The advantage of this is that the sieve may be kept at a relatively constant angle to the general horizontal of the Earth, thus being able to compensate for the traversal of the combine harvester upwards or downwards on a slope. The skilled person will recognise that one of the inherent advantages of the rotary sieve, at least when longitudinal in a machine, is that it is not affected by lateral variances from the vertical of the machine.

FIG. 5 shows a schematic view of a combine harvester 101 equipped with a rotary cleaning shoe 1 as shown in FIGS. 1-4 and 6. Crop that is cut by header H is brought into the combine 101 by known means in the direction of arrow G1 and feeds into axial threshing mechanism 151. Grain and MOG falls from axial thresher 150 in the direction of arrows G2 onto first grain pan 152, which oscillates in known manner so that the Grain and MOG moves in the direction of arrow G3 onto second grain return pan 153, which also oscillates and acts to feed the Grain/MOG into the holes 33a, 33b of cleaning shoe 1 in the direction of arrow G4. Clean grain exits the cleaning shoe 1 in the direction of arrows G5, and MOG exits the cleaning shoe in the direction of arrow G6. Clean grain is collected in collection pan 154 which has angled surfaces to feed the grain down to trough 155, from where it can be collected by auger 156. The auger 156 feeds the grain to a vertical auger (not shown) which ultimately feeds the grain to collection bin 157, atop the combine. It will further be readily appreciated how the action of actuator 21a (and its partner 21b on the far side, unseen in this Figure) can be used to raise or lower the rear end of the rotary cleaning shoe 1 and thus compensate for the longitudinal motion of the combine 101 up or down a slope by changing the angle D of the shoe relative to the plane P of the combine, where P is nominally horizontal when the combine is 'on the flat'.

Figure 6A:
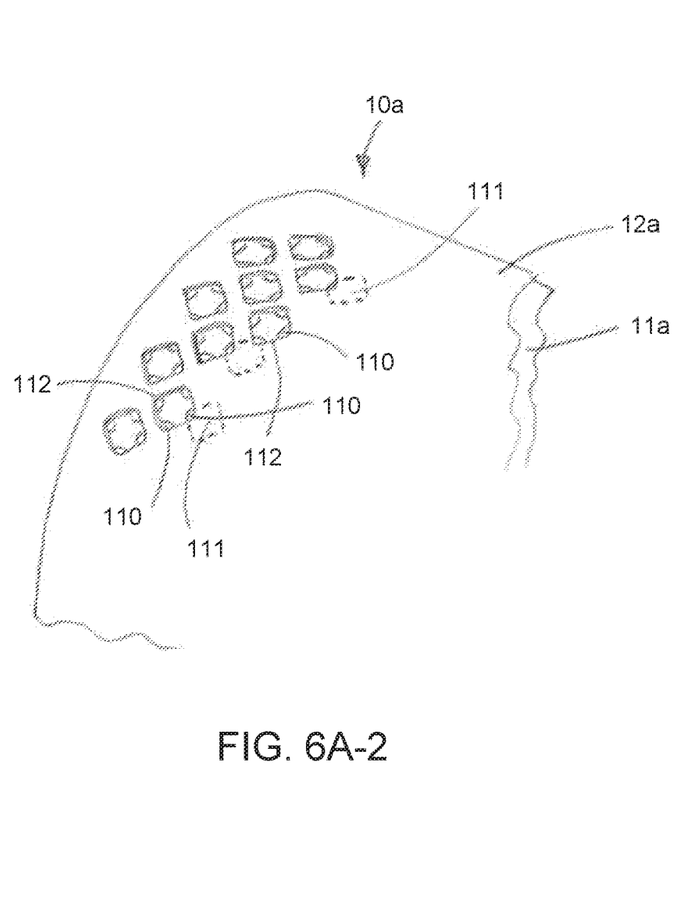
Figure 6A:
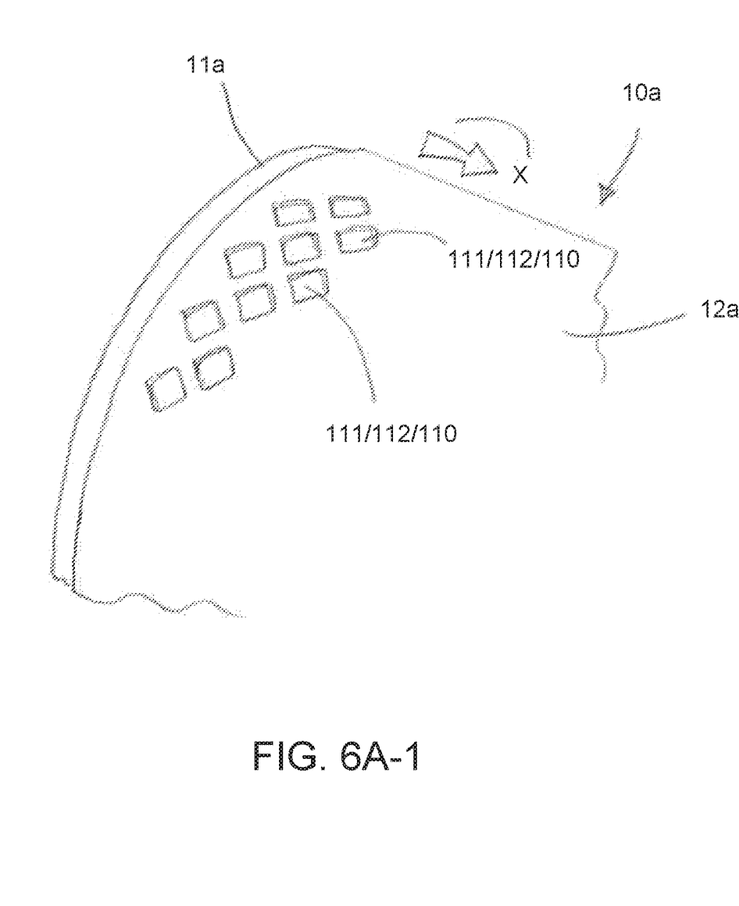

FIGS. 6A-1 and 6A-2 show a section of the rotary sieve 10a in partial close-up view. FIG. 6A-1 shows the inner 11a and outer 12a sieve elements in a 'fully open' position as regards the holes of the sieve. Both sieve elements 11a and 12a are provided with diamond-shaped holes 111 and 112 respectively. When these are aligned as in FIG. 6A-1, they fully overlap and align, and thus the resultant hole size of the overall rotary sieve 10a is the full size of the diamond holes 111, 112. FIG. 6A-2 shows the situation where inner sieve element 11a has been moved longitudinally relative to outer sieve element 12a—in this position the diamond holes 111, 112 in respectively the inner and outer sieve elements 11a, 12a are only partially longitudinally aligned, resulting in smaller holes 110 in the overall sieve 10a. It will be apparent to the skilled person that the control of motion of inner sieve 11a relative to outer sieve element 12a will allow for control of the hole size 110. It will also be apparent to the skilled person that whilst a diamond shape is given in this embodiment, one of any number of other potential shapes may be chosen to provide a suitable effect.

Figure 6B:
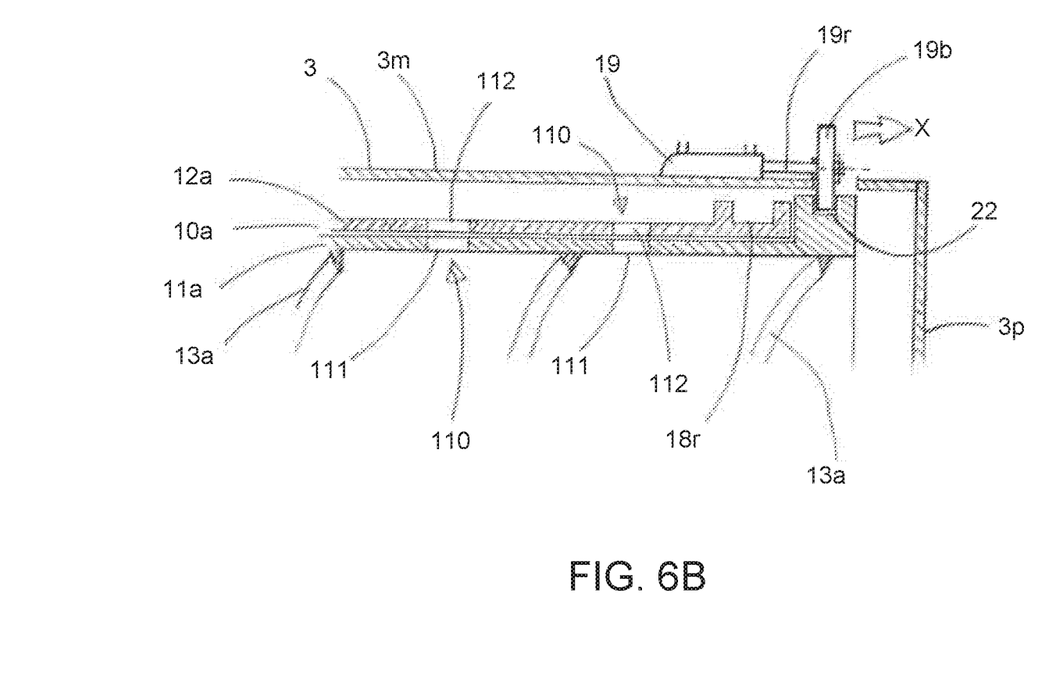
FIG. 6B shows a detailed schematic partial cross-sectional view, in the direction of arrows C in FIG. 3, of an upper section of sieve 10a and the surrounding structure of housing 3, which allows for the control of movement of the inner sieve relative to the outer sieve.

FIG. 6B shows a method of producing the control of the longitudinal alignment of the inner sieve element 11a relative to outer sieve element 12a. It shows a schematic view of a partial sectional view of the top of rotary sieve 10a in the directions of arrows C of FIG. 3. This detail is omitted for clarity from the other Figures. Hydraulic actuator 19 is attached to the outer surface of the housing 3 of the cleaning shoe. Partial cross-sections of inner sieve element 11a and outer sieve element 12a can be seen, with holes 111 and 112 respectively. The channel 18r for the ballraces 15 which support the sieve 10a can be seen on the outside surface of outer sieve element 12a. What is also apparent in this Figure is a channel 22 on the end outside surface of inner sieve element 11a. Actuator 19 has a piston rod 19r which has bearing 19b rotatably fixed on its distal end, and this is arranged so that bearing 19b runs in the channel 22 of the inner sieve 11a. Actuation of the actuator 19 will drive piston rod 19r and bearing 19b in the direction of arrow X. As the outer surface of bearing 19b is longitudinally restrained within channel 22, and as the outer sieve element 12a is similarly longitudinally restrained by engagement with the bearings 15 in the channels 18r and 18f (apparent in FIG. 2), the result of this is that inner sieve 11a will move longitudinally relative to outer sieve 12a. It will be apparent that the position of holes 111 relative to holes 112 will then change and the effect described in relation to FIGS. 6a1 and 6a2 will then occur, ie: the effective size of the hole 110 in the sieve 10a will change. Accordingly the size of holes 110 may be adjusted by controlled actuation of actuator 19.

There is provided in an aspect a rotary sieve cleaning shoe 1 for cleaning grain G, said cleaning shoe comprising at least one rotary sieve (10a, 10b) having a generally cylindrical volume and arranged so as to rotate around a longitudinal axis (Xa, Xb) in use, said cleaning shoe further comprising at least one beater bar 14bb arranged and constructed to lie within the cylindrical volume, characterised in that the beater bar is constructed and arranged to remain stationary within the cylindrical volume as the rotary sieve rotates in use.

The advantage of this aspect is that manufacture of the rotary cleaning shoe is simpler than in prior art devices in which a counter-rotating beater bar is contemplated, whilst providing greater cleaning efficacy than a rotary sieve with no beater. The stationary beater bar assists in the distribution of grain around the inner surface of the rotating sieve.

Figure 7A:
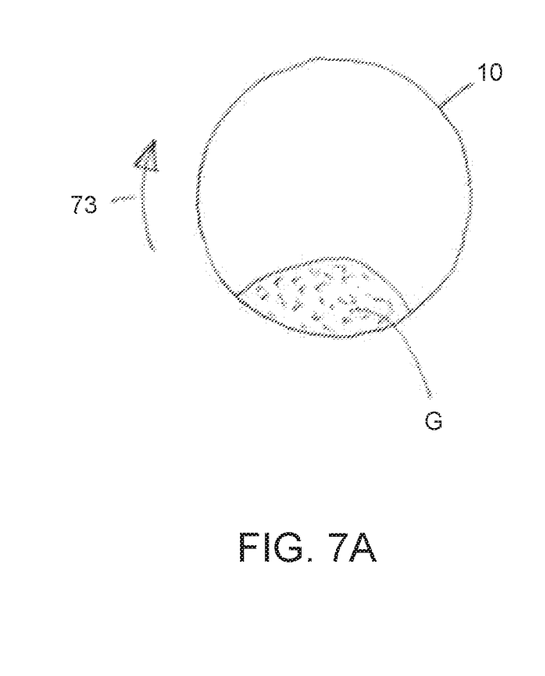
FIG. 7A shows a typical distribution of grain G in a sieve 10, rotating in the direction of arrow 73, where no beater bar is present.
Figure 7B:
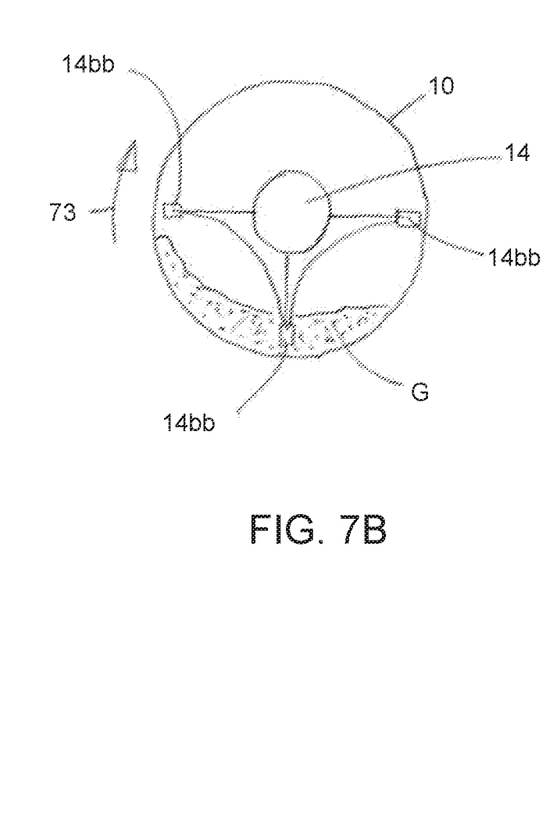
FIG. 7B shows the distribution of grain G where a stationary beater bar 14bb is present.

This can be seen in FIGS. 7A and 7B by way of example. The FIGS. 7A and 7B, show a schematic view, in the direction of arrows B in FIG. 1, of a rotary sieve. FIG. 7A shows a typical distribution of grain G in a sieve 10, rotating in the direction of arrow 73, where no beater bar is present. FIG. 7B shows the distribution of grain G where a stationary beater bar 14bb is present. As can readily be seen, the grain G is distributed over a greater inner surface area of the sieve 10 and thus will be more efficiently sieved. As the rotational speed of the sieve 10 increases, the grain G will spread over a larger inner surface area and more beater bars 14bb will start to act upon the grain.

In embodiments, the inner surface of the rotating sieve is provided with a spiral guide vane. The beater bar acts in cooperation with the spiral guide vane to drive material in the sieve towards the rear end of the sieve (and any machine in which the sieve is included).

There may be a plurality of beater bars arranged in spaced apart relationship around the inner circumference of the rotary sieve.

In embodiments the beater bar or bars may be simple straight longitudinal devices running essentially longitudinally along the inner surface of the rotary sieve, parallel to the longitudinal axis of the rotary sieve.

In embodiments, the beater bar or bars may comprise a spiral on the inner face of the rotary sieve, and this spiral may run in the opposite spiral direction around the inner face of the rotary sieve than the spiral guide vane.

There is provided in an aspect a rotary sieve cleaning shoe 1 comprising a housing 3 and at least one rotary sieve 10, 10a, 10b contained within the housing 3, each said at least one sieve having a longitudinal axis Xa, Xb and said housing 3 being mounted within a combine harvester 101, characterised in that there is further provided actuation means 21a for varying an angle D between a plane P of the combine harvester and the longitudinal axis Xa, Xb of the at least one rotary sieve.

The advantage of this arrangement is that the angle of the longitudinal axis of a rotary sieve may be kept constant relative to the general horizontal plane of the Earth, even though the plane P of the combine harvester may not align with, or may change in relation to, the general horizontal plane of the Earth due to the position of the combine harvester on a slope. Accordingly the sieve may act on the grain constantly in accordance with design even if the combine harvester is moving up or down a slope.

In embodiments the housing 3 has a front end 3a and a rear end 3b, and is pivotally mounted (20af, 20bf) to the combine harvester 101 towards the front end 3a of the housing. The rear end 3b of the housing may be mounted to the combine harvester 101 via at least one actuator 21a, 21b. The actuator or actuators 21a, 21b may be hydraulic or pneumatic cylinders or electromechanical servo units or any other suitable actuator readily known by or available to a skilled person. It will be readily recognised that control of the actuator(s) and therefore the angle D of the cleaning shoe relative to the plane P of the combine harvester 101 may be under either manual control or under the control of an automatic system, which may include a computer. Such an automatic system will be arranged to take as an input the angle of any slope that the combine harvester may be on.

There is provided in an aspect a rotary sieve cleaning shoe 1 comprising at least one rotary sieve 10a, 10b, said at least one rotary sieve being generally cylindrical and arranged so as to rotate around a longitudinal axis Xa, Xb in use, and said at least one rotary sieve 10a, 10b comprising an inner sieve 11a, 11b and an outer sieve 12a, 12b, each of said inner 11a, 11b and outer 12a, 12b sieves being provided with holes 111, 112 respectively, and said inner and outer sieves being arranged such that one of said inner and outer sieves may move longitudinally along the longitudinal axis relative to the other of the inner or outer sieve such that the amount of overlap between the holes 111 and 112 respectively may vary such that the apparent size of a hole 110, corresponding to the overlap, through the rotary sieve 10a, 10b is varied correspondingly.

The advantage of this is that the apparent hole size 110 through the sieve 10a, 10b may be varied as necessary for efficient sieving grains of different crops, or for variances of grain size. Such variances may be due to growing conditions of crops varying from field to field or even in different parts of a field.

It may be that the inner sieve moves or is movable longitudinally relative to the outer sieve.

It may be that the outer sieve moves or is movable longitudinally relative to the inner sieve.

The rotary sieve or sieves may be mounted within a housing 3.

There may be an actuator (19, 19r) or mechanism (19, 19r, 19b) disposed between the housing 3 and one of the inner and outer sieves arranged to move the sieve.

A mechanism for moving an inner or outer sieve may comprise a bearing (19b) constructed and arranged to slot into a corresponding channel (22) of said sieve.

The holes 111 and 112 may be diamond-shaped. The holes may be circular or rectangular or ovoid. Holes 111 in the inner sieve may be differently shaped from holes 112 in the outer sieve. The holes 111, 112, may be different sizes.

Clearly the skilled person will recognise that various aspects, embodiments and elements of the present application, including as illustrated in the figures or described in the clauses above, may be arranged in differing combinations, any and all of which may be considered to fall within the ambit of the inventive concept. The invention will be defined by the following claims.

The invention claimed is:

1. A rotary sieve cleaning shoe for cleaning grain comprising:
   at least one rotary sieve having a cylindrical volume and configured to rotate around a longitudinal axis, each of said at least one rotary sieve having a plurality of holes formed therein;
   a shoe housing surrounding the at least one rotary sieve, wherein grain and material other than grain (MOG) is received into the cylindrical volume of the at least one rotary sieve through an inlet opening in the housing; and
   a beater having a core section running along the longitudinal axis and at least one beater bar positioned radially outward from the core section, the core section statically mounted at ends of the shoe housing so as to position the at least one beater bar within the cylindrical volume of the at least one rotary sieve, and cause the at least one beater bar to remain stationary as the rotary sieve rotates, wherein rotating movement of the rotary sieve around the stationary beater bar separates grain from MOG and causes clean grain to exit the rotary sieve by falling through the plurality of holes in the rotary sieve so that clean grain can be collected.

2. The rotary sieve cleaning shoe of claim 1, comprising a plurality of said beater bars.

3. The rotary sieve cleaning shoe of claim 1, in which said at least one beater bar is proximity located to an inner surface of the at least one rotary sieve.

4. The rotary sieve cleaning shoe of claim 1, wherein the at least one rotary sieve is configured with a spiral guide vane on the inner surface.

5. A combine harvester comprising:
 an axial threshing mechanism configured to thresh crop material harvested by the combine harvester;
 at least one grain pan positioned under and configured to catch grain and material other than grain (MOG) falling from the axial threshing mechanism; and
 a rotary sieve cleaning shoe for cleaning grain comprising:
  at least one rotary sieve having a cylindrical volume and configured to rotate around a longitudinal axis;
  a shoe housing surrounding the at least one rotary sieve; and
  a beater having a core section running along the longitudinal axis and at least one beater bar positioned radially outward from the core section, the core section statically mounted at ends of the shoe housing so as to position the at least one beater bar within the cylindrical volume of the at least one rotary sieve, and cause the at least one beater bar to remain stationary as the rotary sieve rotates;
 wherein the longitudinal axis of the at least one rotary sieve is under the axial threshing mechanism and the at least one grain pan, and the at least one grain pan feeds the grain and MOG into the rotary sieve cleaning shoe;
 wherein the at least one rotary sieve is mounted within the housing, and the grain and MOG is fed from the at least one grain pan into the at least one rotary sieve through inlet openings in the housing.

6. The combine harvester of claim 5, comprising a plurality of said beater bars.

7. The combine harvester of claim 5, in which said at least one beater bar is proximity located to an inner surface of the at least one rotary sieve.

8. The combine harvester of claim 5, wherein the at least one rotary sieve is configured with a spiral guide vane on the inner surface.

* * * * *